United States Patent [19]

Pan

[11] Patent Number: 4,768,960
[45] Date of Patent: Sep. 6, 1988

[54] EDUCATIONAL APPARATUS IN THE SHAPE OF A HUMAN DOLL UTILIZED IN TEACHING KIDS THE DANGERS OF DRUG ABUSE

[76] Inventor: Chiou-Wen S. Pan, 1700 Robb St., Apt. 20, Lakewood, Colo. 80215

[21] Appl. No.: 61,540

[22] Filed: Jun. 11, 1987

[51] Int. Cl.⁴ .............................................. G09B 23/28
[52] U.S. Cl. ...................................... 434/269; 434/370
[58] Field of Search ............... 434/262, 267, 269–275, 434/295, 296, 370; 40/160, 618, 622; 428/13

[56] References Cited

U.S. PATENT DOCUMENTS

| | | |
|---|---|---|
| 340,270 | 4/1886 | Yaggy .................... 434/269 |
| 396,381 | 1/1889 | Yaggy .................... 434/269 |
| 2,472,114 | 6/1949 | Marder .................... 434/404 |
| 3,171,216 | 3/1965 | Douthit et al. ........... 434/269 |
| 3,748,366 | 7/1973 | Rader et al. ............. 434/272 |
| 3,855,714 | 12/1974 | Block .................... 434/269 |
| 4,323,350 | 4/1982 | Bowden .................. 434/269 |
| 4,398,891 | 8/1983 | King ..................... 434/267 |

FOREIGN PATENT DOCUMENTS 804828 1/1969 Canada .

*Primary Examiner*—Samuel Scott
*Assistant Examiner*—Noah Kamen

[57] ABSTRACT

An apparatus in the shape of a transparent human doll having an opening at its top and an open-end box as its base. Several transparent slides, one with a stylized graph of a healthy person's insides with said person's beautiful red arteries, clear blue veins and undamaged internal organs; the rest transparent slides bearing stylized graphs of partially symbolically damaged internal organs depicted as black areas as a result of drug use are to be inserted into or removed from the said doll from its top. The integration or disintegration of the image of the black areas of the transparent slides depicts increasing or decreasing in damage by drug use and disuse. The picture of the transparencies inside said doll give kids strong and direct message of health effects of drug abuse. The doll can be personalized with the photography of the kid who plays with the doll. Two non-transparent slides are also included. One shows a slogan "No! Don't poison me", and the other shows healthy human organs not damaged by drug abuse with vivid red arteries and blue veins on white board. For visual impact, orange colored cardboard can be used for the "No! Don't poison me" slide.

2 Claims, 6 Drawing Sheets

EDUCATIONAL APPARATUS IN THE SHAPE OF A HUMAN DOLL UTILIZED IN TEACHING KIDS THE DANGERS OF DRUG ABUSE

BACKGROUND

Field of Invention

This invention relates to an apparatus in the form of a toy for educational purposes. It forcefully demonstrates to kids in a direct and visible way the potential damage to their internal organs by drug abuse and ensuing deterioration of their health by showing them pictures of internal organs damaged by illegal drug use or increased damage by multiple illegal drug use by a combination of transparencies. Such timely teaching in their formative ages will thereby cultivate in them the desire not to use illegal drugs and to withdraw from said drugs if in use. Kids need to stay healthy so that they can develop physically and mentally, and therefore there is an urgent need for this educational apparatus in the shape of a human doll that they can identify themselves with and play with it so that an emotional impact will result in their firm refusal to use illegal drugs or if already using them to withdraw from using said drugs at once.

Description of Prior Art

Heretofore movies and posters are used to discourage drug abuse. However, none of them are specifically for young kids and none of the prior arts kids can identify personally and emotionally with themselves in order to achieve the best results in preventing drug abuse. This invention remedies this situation. Previously transparent conduits have been used as a teaching aid to demonstrate circulation of a drug being administered either orally or intravenously, and which includes a transparent model of the upper portion of human body (1). Also an educational device for demonstrating the progressive depth layers of the human body. The device uses multilayer of slides manipulated with pulleys (2). Also an educational kit for teaching children letters of alphabet vocally. No transparency is used in the device (3). None of these inventions contributed directly to the said invention which is an apparatus and a toy. It is a transparent doll with an opening at its top for the insertion and retriever of educational slides symbolically showing damages caused by drug abuse.

(1) James R. Rader and Paul W. Smith. Teaching aid for demonstrating drug circulation or the like in human body. U.S. Pat. No. 3,748,366 (07/24/73).
(2) Loren B. Douthit and Elizabeth G. Saze. A device for demonstrating the progressive depth layers of the human body. U.S. Pat. No. 3,171,216 (03/02/65).
(3) Mildred D. King. Body related teaching kit. U.S. Pat. No. 4,398,891 (08/16/84).

DISCLOSURE OF INVENTION

In accordance with present invention, there is provided a human doll of which the whole body or front torso is transparent and the body is hollow with an opening on the top for the insertion and retrieval of transparent slides, each of which depicts internal organs damaged by the ingestion of an illegal drug. A combination of the slides show increased damages to internal organs by multiple drug abuse. A bag is adhered to the back of said doll to hold the slides when they are not in use. On the top of the bag a slot is provided, into it the child's latest personal photograph can be inserted and displayed above the stored slides. The photograph identifies the child with said doll physically and emotionally. When a child does not use an illegal drug or he/she has withdrawn from all illegal drugs the slide with clean organs is inserted and he/she is now a Nodrug Kid and should be proud of himself/herself. At the foot of said toy is an open end box to keep the latest literature on drug abuse.

DRAWING FIGURES

Figure 1:
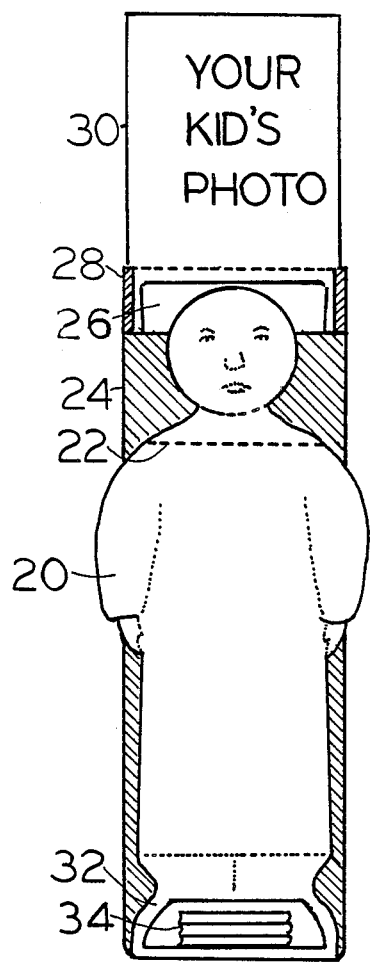
FIG. 1 shows the front view of the personalized transparent apparatus in the shape of a human doll.

DRAWING REFERENCE NUMERALS 20 the transparent three dimensional figure in the shape of a human doll.
22 the opening from the top of the head to the shoulders; from it the slides shown drug damages are to be inserted or removed.
24 the slide storage bag for the storage of the transparent and non-transparent slides when not in use; the slides therein are to be transferred back and forth between 24 and 22.
26 the transparent healthy and drug-damage slides and some non-transparent slides.
28 the slot to hold the photography of the child who is playing with the doll.
30 the photograph of the child who plays with the doll.
32 open-end box serving as the holder of the latest literature on drug-abuse.
34 the current drug-abuse literature.
40 in red color
42 in blue color
44 in black color
50 location for drug name label

SIMPLE APPARATUS IN THE SHAPE OF A HUMAN DOLL TO DETER DRUG Abuse

Description

Figure 2:
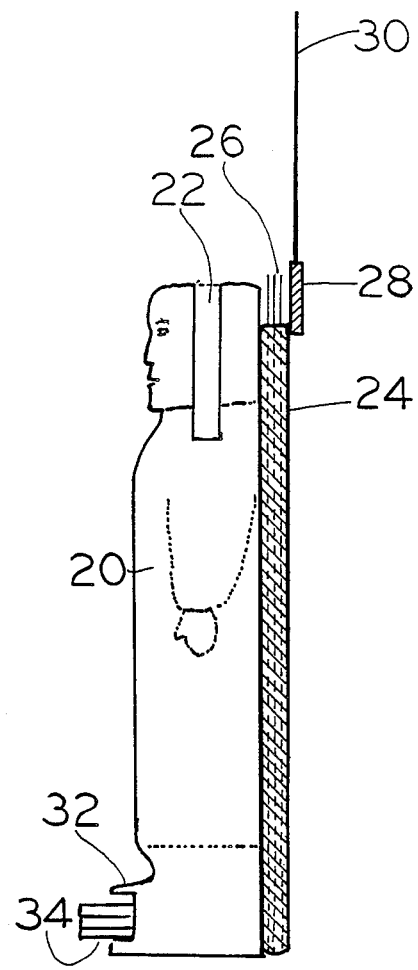
FIG. 2 shows the side view of the personalized transparent apparatus in the shape of human doll. Labels same as in FIG. 1.
Figure 3:
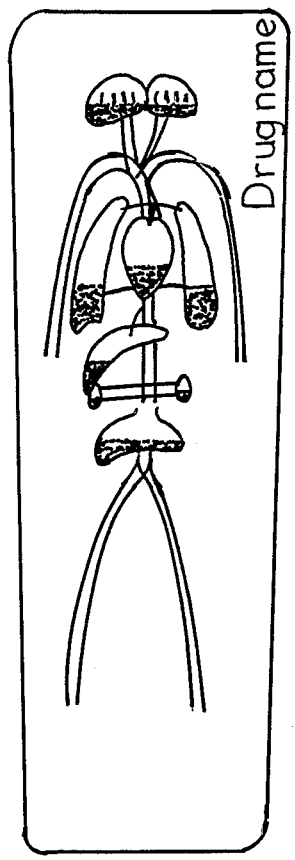
FIG. 3 shows a transparency containing a sketch of stylized internal organs and blood circulation systems with damages caused by the abuse of drugs. Black areas represent damages.
Figure 4:
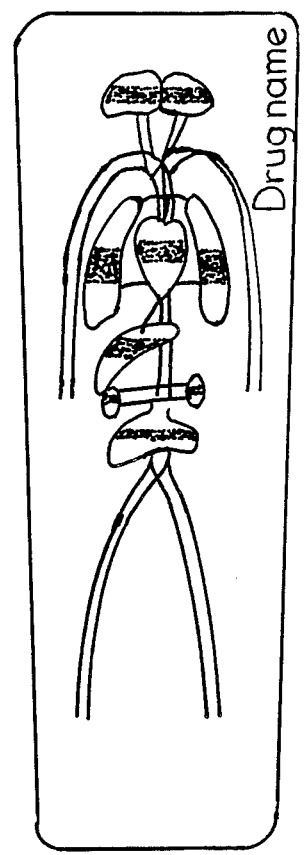
FIG. 4 shows a transparency depicting damages by a second drug.
Figure 5:
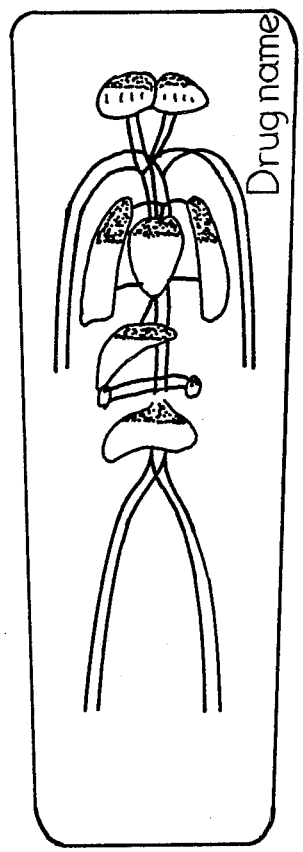
FIG. 5 shows a transparency depicting damages by a third drug.
Figure 6:
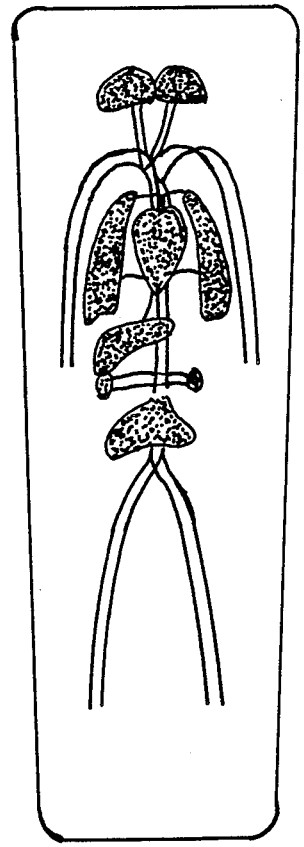
FIG. 6 shows the combined view of FIG. 3, 4 and 5 representing total damage by using a number of drugs or using a single drug in large quantity.
Figure 7:
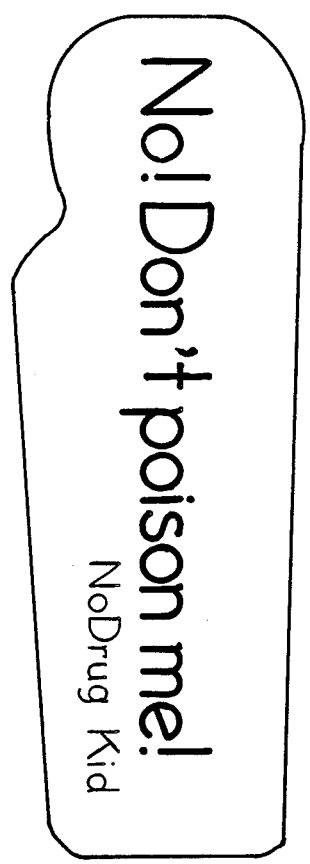
FIG. 7 shows a non-transparent slide with the slogan "No! Don't poison me!".
Figure 8:
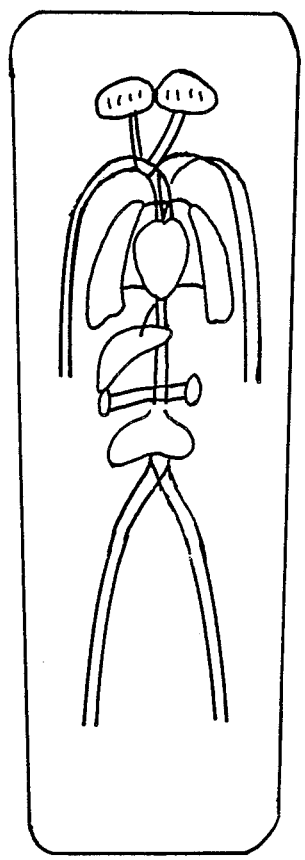
FIG. 8 shows healthy internal organs of a kid who does not use any drug or who used drugs but has withdrawn from said drugs. The kid is a "NoDrug Kid".
Figure 9:
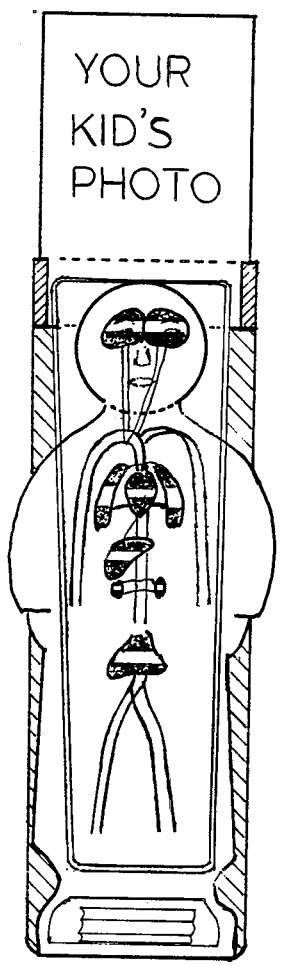
FIG. 9 shows the combined view of FIGS. 3 and 5 transparencies from the front of the doll.
Figure 10:
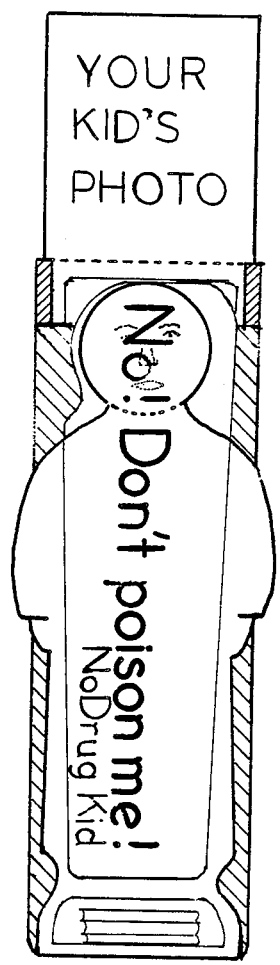
FIG. 10 shows the doll with FIG. 7 slide inside to demonstrate the kid's determination not to use drugs after learning the dangers of drug abuse from playing with this "NoDrug Kid" doll.
Figure 11:
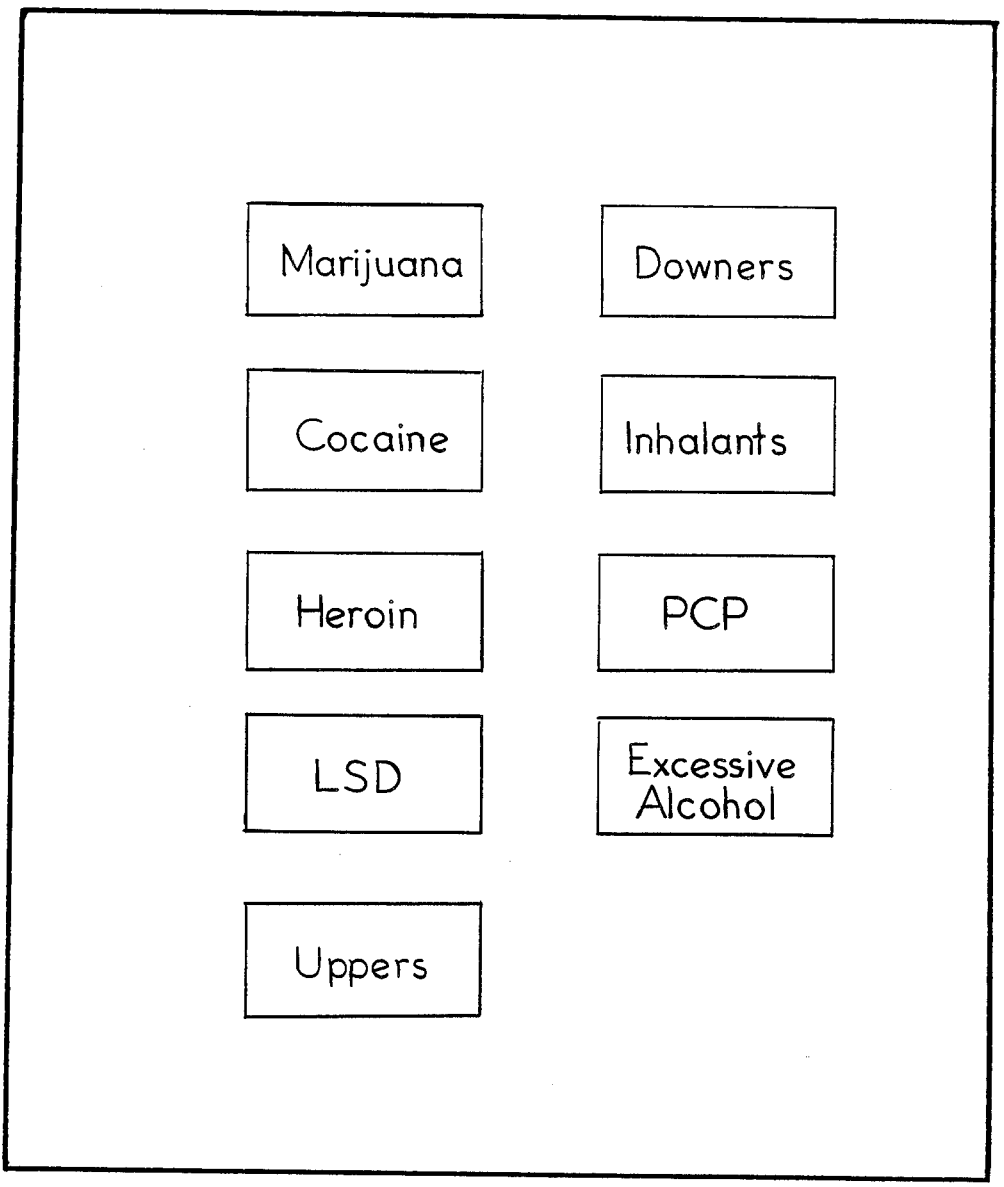
FIG. 11 shows removable labels with the names of some of the illegal drugs and one with excess alcohol; any of these labels can be placed on drug damage transparencies FIGS. 3, 4, 5, and/or 6.

FIGS. 1 and 2 show respectively the front and the side view of a transparent apparatus in the shape of a human doll. The doll comprises of the transparent three dimensional FIG. 20 and the slide storage bag 24. The doll has an opening 22 from the top of its head down to the broad side of its shoulders. The hole of the opening reaches down to the bottom of the figure. The transparent and non-transparent slides are kept in the storage bag 24. A slot at the top of the bag holds the doll player's photograph 28. An open-end box 32 at the bottom of the figure holds current drug abuse literature 34. FIGS. 3, 4, and 5 show transparencies with pictures of stylized human internal organs and blood circulation system. The arteries are in red color 40 and the veins in blue color 42. The black areas 44 depict the damages caused by drug abuse. Area 50 is location for the drug name label, which is shown in FIG. 11. FIGS. 3, 4, and 5 symbolically show damages done respectively by three different drugs. FIG. 6 shows the combined view of FIGS. 3, 4, and 5 depicting total damage done by using a number of drugs or by using a single drug in large quantity. FIG. 7 shows the non-transparent slide with the resolution or determination of the kid to refuse or quit drugs after viewing the damages or possible damages done to his/her body as shown by FIGS. 3, 4, 5 and/or 6. FIG. 8 shows the stylized healthy internal organs of a kid who refuses to use any drugs or has withdrawn from using said drugs. He/she is now a drug-free "NoDrug Kid". FIG. 9 shows the front view of the transparent doll looking through the combined image of transparencies of FIGS. 3 and 5 depicting a combined image of the damages done to internal organs. FIG. 10 shows the front view of the doll containing the slogan slide of FIG. 7.

Simple Apparatus Toy to Deter Drug Abuse

Operation

Before playing with the doll, the kid should preferrably place a recent photograph of himself/herself on slot 28 shown in FIGS. 1 and 2 in order to identify the doll emotionally with himself/herself. Transfer slide FIG. 8 of "NoDrug Kid" from the storage bag 26 of FIGS. 1 or 2 and insert it into the body 20 of the figure through its opening 22. The front view of FIG. 1 is the view of a healthy person. Transfer more transparencies FIGS. 3, 4, and 5 from the storage bag 24 one by one into the body 20 of the figure until a combined view is formed in the likeness of FIG. 6 depicting a total damage of the internal organs and the complete deterioration of the kid's health. The kid who plays with the doll should then remove slides FIGS. 3, 4, and 5 one by one and he/she should see the reduction of the damaged areas until the healthy internal organs of FIG. 8 appears again. The visual concept instills in the young mind the distinct message of the dangers of drug abuse. After that he/she will transfer the slogan slide "No! Don't poison me!" into the body 20 of FIG. 1 to declare his/her determination to refuse all illegal drug uses. The current literature on drug abuse 32 stored in the open-end box 34 at the base of the figure give the kid and his/her parents more knowledge on drug abuse. This further reinforces the determination of the kid to refuse illegal drug use.

Although the above describes many specificities, they should not be construed as limitations on the scope of the invention. Other possible variations of embodiments can be envisioned within its scope. For example skilled artisans will readily change the human doll into some figures of animals or a mere clear container with attached heads and limbs and they can also change the contents of the slides, which can be added and removed readily in any number as characterized in the invention, into any drawing or print for some other educational, non-educational or recreational purposes. The transparent figure can be made into any size and of any transparent material. The reader is hereby requested to determine the scope of the invention by the appended claims and their legal equivalents instead of by the examples that have been given.

I claim:

1. A simple apparatus for illustrating forcefully and vividly the effect of an ingested harmful substance upon a living creature comprising:
   a. a generally transparent three dimensional figure of said creature.
   b. means vertically disposed within said figure adapted uniquely to receive or retrieve one or more planar visualization slide means;
   c. at least one transparent, planar, visualization slide means removably insertable within said figure, said slide means containing thereupon a visual illustration of one or more organs of the creature with means therein showing deterioration of function due to ingestion of an identified harmful substance, said visualization slide means further having thereupon an identification means for said substance;
   d. such that whenever two or more such visualization slide means are inserted and superimposed within said figure a combined image appears illustrating an increase in deterioration of body function as a result of the ingested harmful substances identified on said identification means.

2. The apparatus as described in claim 1 above wherein said figure further comprises:
   a. a head section, a torso section, and a leg section depicting a human figure;
   b. an open container under said figure adapted for holding literature descriptive of drug abuse or similar matters;
   c. a bag adhered to the back of said figure for storing said slide means when not in use;
   d. a receiving slot attached to the top of said figure, adapted to receiving and holding the photograph of an individual;
   e. a waxy card containing removable labels each with a name of an illegal drug and one specifically for excessive alcohol, wherein the label can be put on slide means for identification.

* * * * *